Nov. 13, 1956
E. WILSON
2,770,496
AUTOMOBILE DRIER
Filed Jan. 4, 1954
2 Sheets-Sheet 1
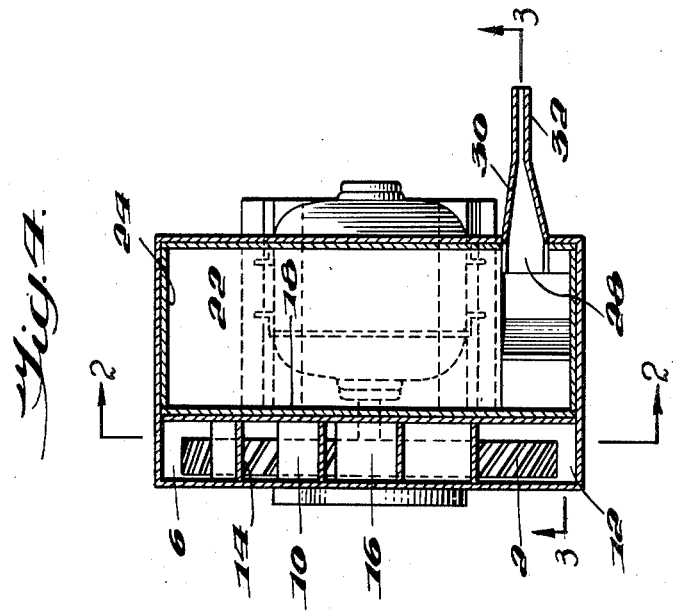
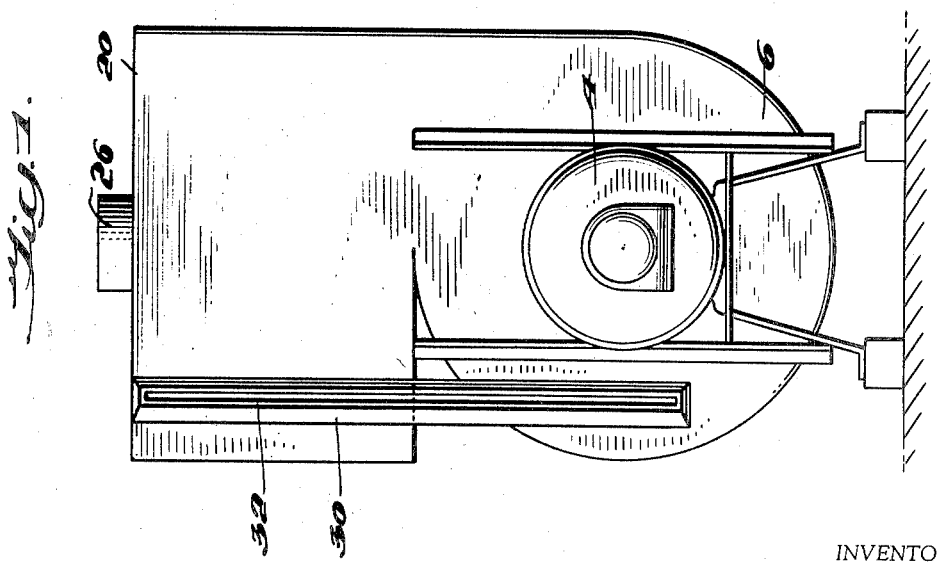
INVENTOR:
EARL WILSON,
BY Bailey, Stephens & Huettig
ATTORNEYS

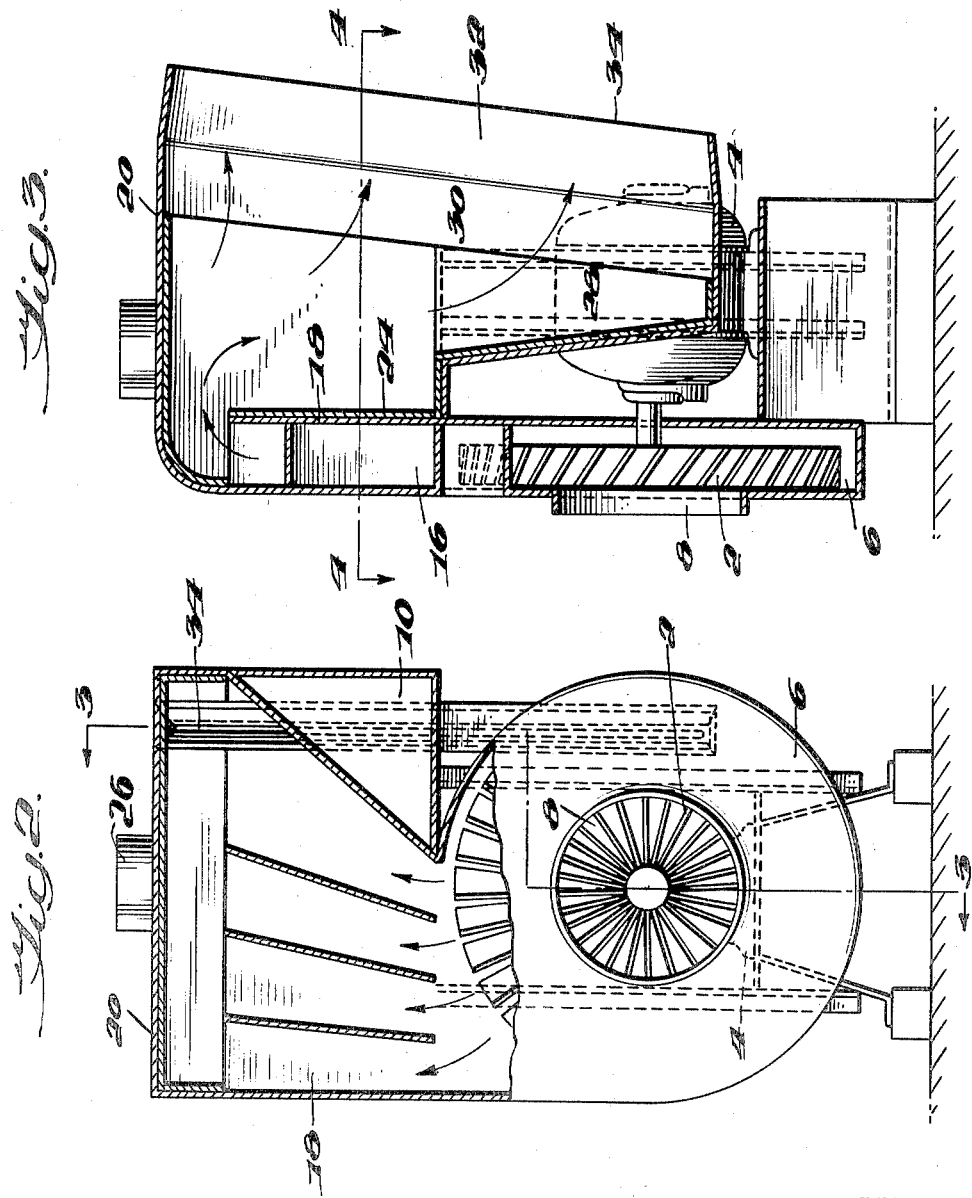

2,770,496

AUTOMOBILE DRIER

Earl Wilson, Long Beach, Calif.

Application January 4, 1954, Serial No. 401,788

3 Claims. (Cl. 299—58)

The invention relates to devices for emitting streams of air, and more especially to drying devices for use in automobile washing installations.

The primary object of the invention is to provide an inexpensive, economical, simple and efficient mechanism for blowing air against automobiles as they travel past the mechanism.

Another object of the invention is to provide such an arrangement having a novel type of outlet nozzle for ensuring the projecting of the air at high pressure towards the automobile.

A further object of the invention is to provide an arrangement of this type which is relatively quiet in operation.

An additional object of the invention is to provide for the gradual slowing down of the air from the fan before it reaches the exhaust nozzle.

Further objects and advantages of the invention will appear more fully from the following description, especially when taken in conjunction with the accompanying drawings which form a part thereof.

In the drawings:

Fig. 1 shows in front elevation a blowing device embodying my invention;

Fig. 2 is a rear view, with parts in section on the line 2—2 of Fig. 4;

Fig. 3 is a vertical cross-section on the line 3—3 of Fig. 4; and

Fig. 4 is a horizontal cross-section on the line 4—4 of Fig. 3.

In the form shown herein, a fan 2 driven by a motor 4 is arranged within a fan casing 6. This draws air in through opening 8 and forces it into outlet chamber 10, as indicated by the arrows in Fig. 2. Chamber 10 is of increasing width away from fan 2, since its side walls 12, 14 diverge as shown in Fig. 2. In order to secure more uniform distribution of air through chamber 10, a plurality of vanes 16 of varying inclination are provided across the chamber 10.

Front wall 18 of chamber 10 terminates short of the top wall 20 of the casing, so that chamber 10 communicates with muffler chamber 22. Chamber 22 is lined internally with a layer of sound insulating material 24. In top wall 20 is a pipe 26, through which a part of the air passes to an arrangement for blowing air on the top of the automobile.

At one side, chamber 22 has a downward extension 28. From this side of the chamber and from the downward extension, there extends a nozzle formed by elongated converging walls 30 and nearly parallel walls 32. The space between these walls is closed at top and bottom. The front edge 34 of the nozzle is slightly inclined towards the rear, as shown in Fig. 3.

With such an arrangement, the air from the blower passes up through chamber 10, being properly distributed therein by vanes 16, and over into muffler chamber 22. In chamber 10 the velocity of the air is gradually slowed down and its static pressure increased. Muffler chamber 22 reduces the turbulence of the air before it passes to the nozzle, and also reduces the noise of operation. The nozzle assures a high-velocity stream of air which is very effectively directed against the side of an automobile passing the nozzle and is especially efficient in its drying action.

Of course, one of these driers is placed on each side of the path of the automobile. Preferably, the pipes 26 of these two driers feed a common pipe which has nozzles arranged to emit air against the top of the automobile.

While I have described herein one embodiment of my invention, I wish it to be understood that I do not intend to limit myself thereby except within the scope of the claims hereto or hereinafter appended.

I claim:

1. An automobile drier comprising a rotary fan, a diffuser chamber of increasing cross-section connected to the outlet of the fan, a muffler chamber connected to said diffuser chamber, said muffler having a vertical extension therefrom adjacent one side thereof and offset therefrom in a direction transverse to the axis of rotation of the fan, and converging plates arranged in substantially vertical planes forming a nozzle communicating with said muffler chamber and said extension, the nozzle opening comprising a relatively narrow, vertically elongated slit.

2. An automobile drier comprising a rotary fan, a diffuser chamber of increasing cross-section connected to the outlet of the fan, a muffler chamber connected to said diffuser chamber, said muffler having a vertical extension therefrom adjacent one side thereof and offset therefrom in a direction transverse to the axis of rotation of the fan, converging plates arranged in substantially vertical planes, the space between said plates communicating with said muffler chamber and said extension, and substantially parallel plates at the free edges of the converging plates, said plates forming a nozzle.

3. In a drier as claimed in claim 4, the free edges of the parallel plates being rearwardly inclined.

References Cited in the file of this patent

UNITED STATES PATENTS

| | | |
|---|---|---|
| 873,301 | Commings | Dec. 10, 1907 |
| 875,188 | Kohler | Dec. 31, 1907 |
| 1,239,373 | Frazer | Sept. 4, 1917 |
| 1,272,031 | Gohmert | July 9, 1918 |
| 1,702,616 | Peters | Feb. 19, 1929 |
| 1,862,396 | Gray | June 7, 1932 |
| 2,160,666 | McMahon | May 30, 1939 |
| 2,374,955 | Raper | May 1, 1945 |